(12) United States Patent
Kesling

(10) Patent No.: US 10,993,786 B2
(45) Date of Patent: May 4, 2021

(54) ORTHODONTIC BRACKET HAVING FIXED LIGATING TABS

(71) Applicant: Andrew C. Kesling, La Porte, IN (US)

(72) Inventor: Andrew C. Kesling, La Porte, IN (US)

(73) Assignee: TP ORTHODONTICS INC., La Porte, IN (US)

( * ) Notice: Subject to any disclaimer, the term of this patent is extended or adjusted under 35 U.S.C. 154(b) by 342 days.

(21) Appl. No.: 15/968,386

(22) Filed: May 1, 2018

(65) Prior Publication Data

US 2018/0318047 A1     Nov. 8, 2018

Related U.S. Application Data

(60) Provisional application No. 62/500,334, filed on May 2, 2017.

(51) Int. Cl.
   *A61C 7/28*        (2006.01)
   *A61C 7/14*        (2006.01)

(52) U.S. Cl.
   CPC ................ *A61C 7/28* (2013.01); *A61C 7/143* (2013.01)

(58) Field of Classification Search
   CPC .................................. A61C 7/28; A61C 7/143
   See application file for complete search history.

(56) References Cited

U.S. PATENT DOCUMENTS

| | | | |
|---|---|---|---|
| 2,926,422 A | 1/1959 | Wallshein | |
| 4,793,804 A | 12/1988 | Schudy | |
| 4,842,512 A | 6/1989 | Kesling | |
| 5,125,832 A | 6/1992 | Kesling | |
| 5,711,666 A | 1/1998 | Hanson | |
| 6,582,226 B2 | 6/2003 | Jordan et al. | |
| 6,663,385 B2 | 12/2003 | Tepper | |
| 6,682,345 B2 | 1/2004 | Kesling et al. | |
| 7,306,457 B2 | 12/2007 | Vigolo | |
| 2005/0069833 A1 | 3/2005 | Chikami | |
| 2006/0046223 A1 | 3/2006 | Abels et al. | |

(Continued)

FOREIGN PATENT DOCUMENTS

| | | |
|---|---|---|
| ES | 2605609 | 3/2017 |
| WO | WO 2010/007272 A2 | 1/2010 |
| WO | WO 2010/007272 A3 | 1/2010 |

OTHER PUBLICATIONS

International Search Report and Written Opinion for PCT/US2018/030493, dated Sep. 18, 2018.

*Primary Examiner* — Nicholas D Lucchesi
*Assistant Examiner* — Hao D Mai
(74) *Attorney, Agent, or Firm* — Cook Alex Ltd.

(57) ABSTRACT

A self-ligating orthodontic bracket having no movable or flexible parts includes a base having front and rear surfaces. The rear surface is adapted for attachment to the crown of a tooth. A body member is attached to the base and includes an upper half and a lower half, with facing archwire slot surfaces formed on the lower and upper sides thereof, respectively. One or more slot separating tabs are formed on the body member halves and extend vertically toward the other body member half at least partially beyond the archwire slot surface of the body member half to which the slot separating tab is attached. One or more ligating tabs are formed on the body member halves. The body member halves, slot separating tabs and ligating tabs are arranged such that they define an entry opening to a pair of archwire slots, the openings being non-linear in a mesial-distal direction.

17 Claims, 3 Drawing Sheets

(56) References Cited

U.S. PATENT DOCUMENTS

| | | |
|---|---|---|
| 2006/0204917 A1 | 9/2006 | Clor |
| 2012/0052459 A1 | 3/2012 | Bingmin et al. |
| 2012/0208143 A1 | 8/2012 | Zucchi et al. |
| 2015/0017596 A1 | 1/2015 | Wong et al. |
| 2015/0072299 A1 | 3/2015 | Alauddin et al. |
| 2016/0030139 A1 | 2/2016 | Braun |

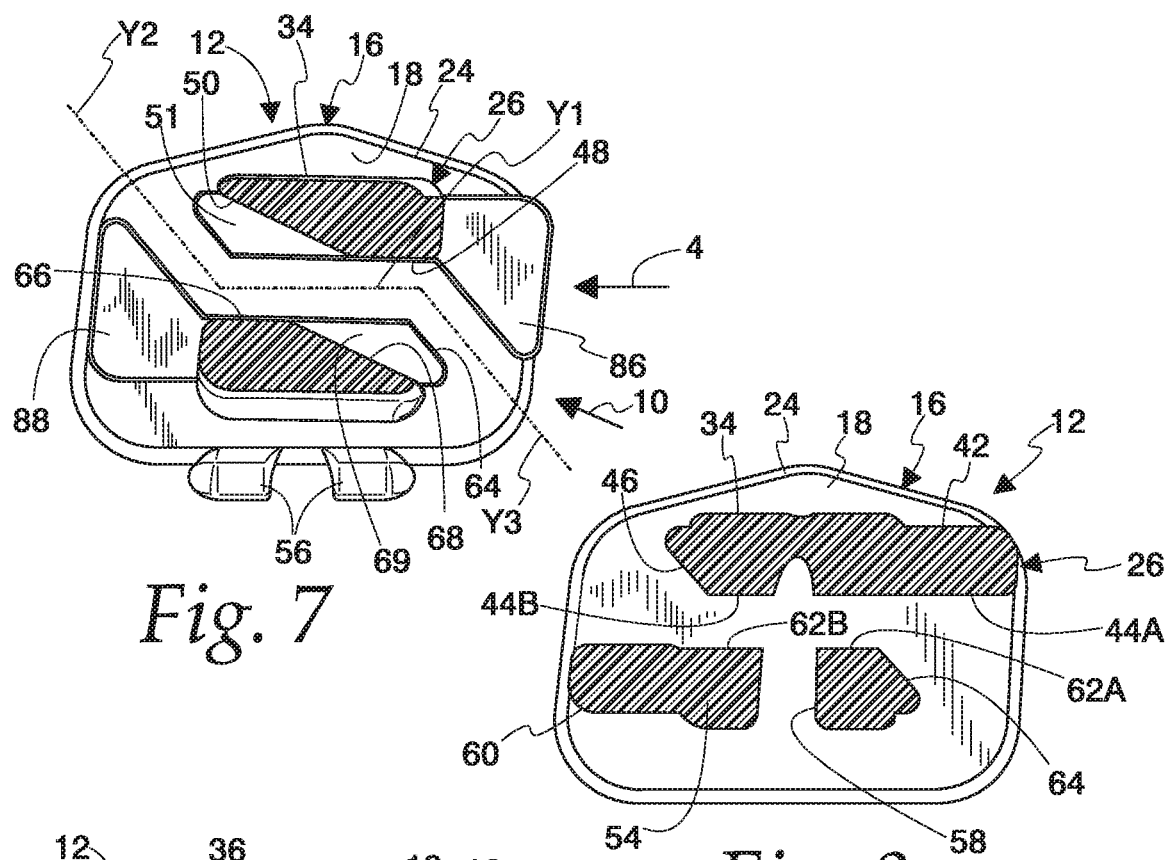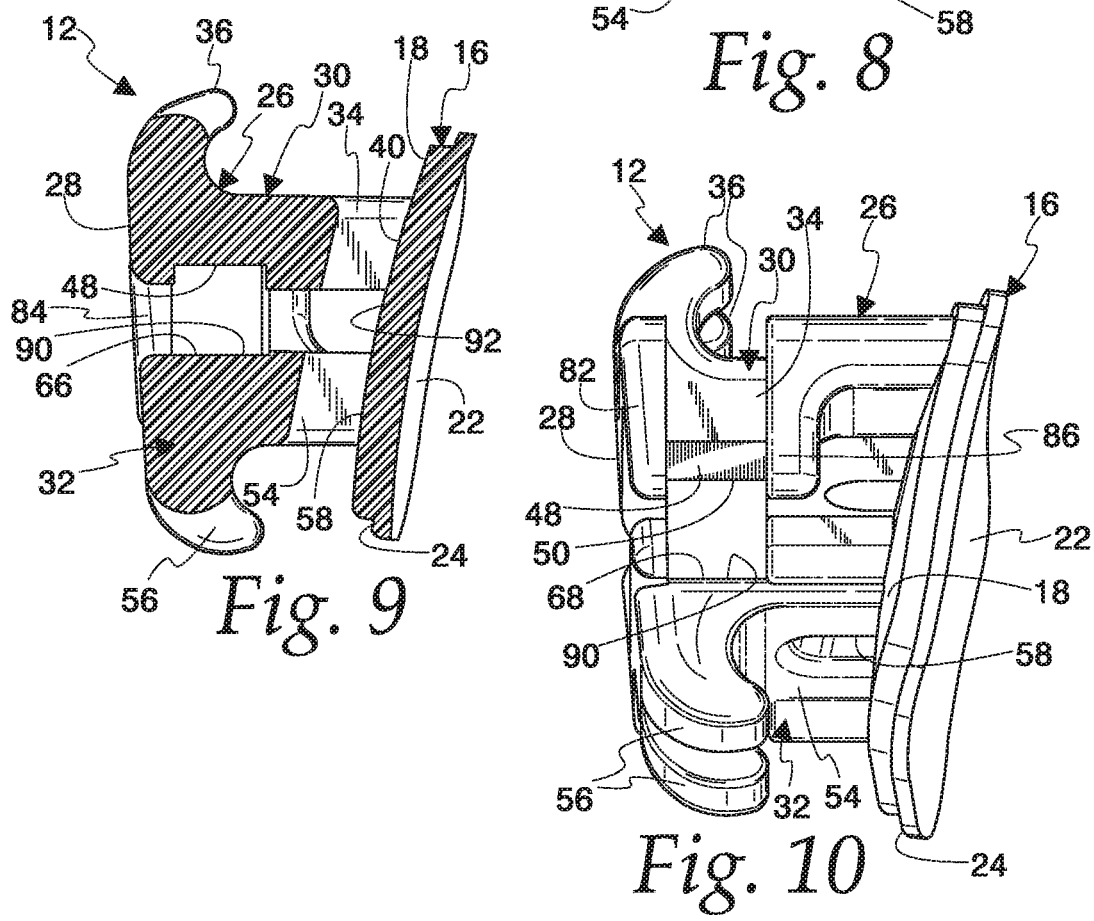

ORTHODONTIC BRACKET HAVING FIXED LIGATING TABS

FIELD OF THE DISCLOSURE

The present application claims the benefit of U.S. Application Ser. No. 62/500,334, filed May 2, 2017 the disclosure of which is incorporated herein in its entirety.

FIELD OF THE DISCLOSURE

The present disclosure is directed generally to an orthodontic appliance for connecting an archwire to a tooth, and more particularly to an orthodontic bracket that has an archwire slot that is open to the front for insertion or removal of an archwire in the bracket.

BACKGROUND

The following definitions of dental directional terms will be used herein to explain the structure of the orthodontic brackets of the present disclosure:

Mesial—along and toward the front of the dental arch;
Distal—along and toward the back of the dental arch;
Buccal/labial—normal to the dental arch and toward the cheek or lip, for simplicity this will also be referred as the front or forward direction;
Lingual—normal to the dental arch and toward the tongue, for simplicity this will also be referred to as the back or rear direction;
Tip—inclination of a bracket or tooth in mesial-distal direction;
Torque—inclination of a bracket or tooth in labial-lingual direction;
Occlusal/incisal—toward the biting surface of a tooth;
Gingival—toward the gums; for simplicity the gingival-occlusal/incisal direction will be referred to as the vertical direction;
Mandibular—toward the lower jaw;
Maxillary—toward the upper jaw.

It has been known to provide orthodontic brackets having dual mesial-distally extending tunnels or archwire slots. Typically the rear tunnel has been closed to the front of the bracket, as for example in U.S. Pat. No. 6,682,345. The closed tunnel necessitates installing an archwire by threading it lengthwise through the closed tunnel, as opposed to the much easier front-to-rear, horizontal insertion in a direction perpendicular to the length of the archwire. There are, however, known brackets which include a pair of labial-buccally opening archwire slots one of which, when coacting with an archwire and there being selective forces applied between the archwire and bracket, will allow crown tipping and root uprighting movements and the other of which, when coacting with a rectangular archwire, may provide both torquing and mesial-distal axial control. See U.S. Pat. No. 4,842,512. A problem with this bracket is it requires a ligature to retain the archwires in the labial-buccally opening archwire slots. A ligature is a small flexible band that wraps around tie wings on the bracket to hold the archwire in place. Ligatures can be made of elastomeric material or metal wire or bands.

The problems resulting from the use of ligatures have been addressed by self-ligating orthodontic brackets that eliminate the need to rely on ligatures for retaining an archwire in the archwire slot of the bracket. A self-ligating bracket is intended to eliminate any problem encountered in ligature failure, whether the ligature is elastomeric or wire in form. Self-ligating brackets typically have a moveable component that entraps the archwire in its slot. For example, self-ligating brackets that have a ligating latch spring member are disclosed in U.S. Pat. No. 5,711,666. However, self-ligating brackets with moveable parts are burdened by complex mechanical configurations that have a tendency to excessively trap food particles, irritate the tissues of the mouth, and impose difficulty in opening and closing procedures.

Other self-ligating brackets use flexible members that bend or flex to allow an archwire to be forced past them into an archwire slot but the flexible members are intended to be stiff enough to prevent release of the archwire during normal use. U.S. Pat. Nos. 6,582,226 and 6,663,385 are examples of such brackets having a flexing ligature built into the bracket. These brackets present manufacturing difficulties in terms of incorporating the flexible ligating members into the rigid materials of the remainder of the bracket.

Static self-ligating brackets having no moving or flexible parts are also known. An example is shown in U.S. Patent Publication No. 20160030139. This bracket requires use of an archwire having a non-uniform cross-section, such as rectangular or oval, that defines major and minor dimensions. The bracket has fixed wings that define a narrow entry aperture to an archwire slot. The entry aperture has a narrow width that accepts only the minor dimension of an archwire's cross-section. During installation of the archwire it is rotated so as to present its minor dimension to the entry aperture. This permits the archwire to laterally enter the archwire slot whereupon the archwire is rotated so that the major dimension of its cross-section is presented to the entry aperture. The major dimension is too large to fit back through the entry aperture so the archwire remains trapped in the archwire slot until such time as it is deliberately rotated to allow the minor dimension to lead the archwire back out of the slot. This structure has the disadvantage that archwires with square or round cross sections cannot be used.

Another static self-ligating bracket is shown in U.S. Pat. No. 7,306,457. This bracket has a support body intended to be fixed onto a tooth and provided with a slot for receiving an archwire. A retaining means is able to interfere with the archwire so as to lock it inside the slot. The retaining means are formed by a pair of lugs made as one piece with the support body and having a retaining portion which delimits the slot at the top and interferes with the archwire. The pair of lugs are provided with two opposite faces which delimit an opening of a channel for access to the slot. A problem with this bracket is its insertion slot extends in a straight line at an angle to horizontal and therefore requires the entirety of the archwire portion that engages the bracket to be fully aligned with the insertion slot before any of the archwire can be rotated to the final, horizontal archwire slot. This complicates the installation procedure.

SUMMARY

In one aspect, the present disclosure concerns an orthodontic bracket that is self-ligating but requires no moving parts, no flexible parts and no specially shaped cross-section of an archwire. The bracket of the present disclosure has a base with front and rear surfaces. The rear surface of the base is adapted for attachment to the crown of a tooth. A body member is attached to the front surface of the base and extends forwardly from the base to a front face of the body member. The body member includes an upper half and a lower half. Archwire slot surfaces are formed on the body member halves, with the upper body member half having an archwire slot surface on the underside thereof and the lower body member half having an archwire slot surface on the upper side thereof such that the archwire slot surfaces are at least partially in facing relation. The archwire slot surfaces are vertically separated with the closest vertical separation of the archwire slot surfaces defining an archwire slot height.

The bracket has at least two slot boundary tabs. Each slot boundary tab is formed on one of the upper and lower body member halves and extends vertically toward the other of the upper and lower body member halves. The slot boundary tabs extend at least partially beyond the archwire slot surface of the body member half to which the slot boundary tab is attached. The portion of the other of the upper and lower body member halves in facing relation with the slot boundary tab is arranged such that the slot boundary tab approaches said other of the upper and lower body member halves no closer than the archwire slot height. One of the slot boundary tabs is located at or near the front face of the body member while the other slot boundary tab is located intermediate the front face of the body member and the front surface of the base. Accordingly, the archwire slot surfaces of the body member halves and the slot boundary tabs collectively define at least two archwire slots which are accessible from the front of the bracket and have a height and a depth which allow at least two archwires to be supported by the body member halves therein.

In another aspect, the bracket of the present disclosure has archwire slot surfaces on the body member halves and a pair of lingually-labially spaced slot boundary tabs that together define two archwire slots that have an entry opening. The entry opening defines a non-linear mesial-distal axis. With this arrangement insertion of the archwire requires that the archwire must be lifted up and over an upwardly facing slot boundary tab. Alternately, the archwire may be pressed down and under a downwardly facing slot boundary tab. Or both actions may be necessary if there are both upwardly and downwardly facing slot boundary tabs. In any case, the archwire ends up behind the slot boundary tab or tabs which hold it in the archwire slot.

BRIEF DESCRIPTION OF THE DRAWINGS

FIG. 7 is a section taken along line 7-7 of FIG. 3.
FIG. 8 is a section taken along line 8-8 of FIG. 3.
FIG. 9 is a section taken along line 9-9 of FIG. 3.
FIG. 10 is a modified right end elevation view of the bracket of FIG. 1, with the bracket rotated counterclockwise slightly about line 9-9 of FIG. 3 such that the view is looking generally in the direction of arrow 10 in FIG. 7.

DETAILED DESCRIPTION OF THE EMBODIMENTS

Figure 1:
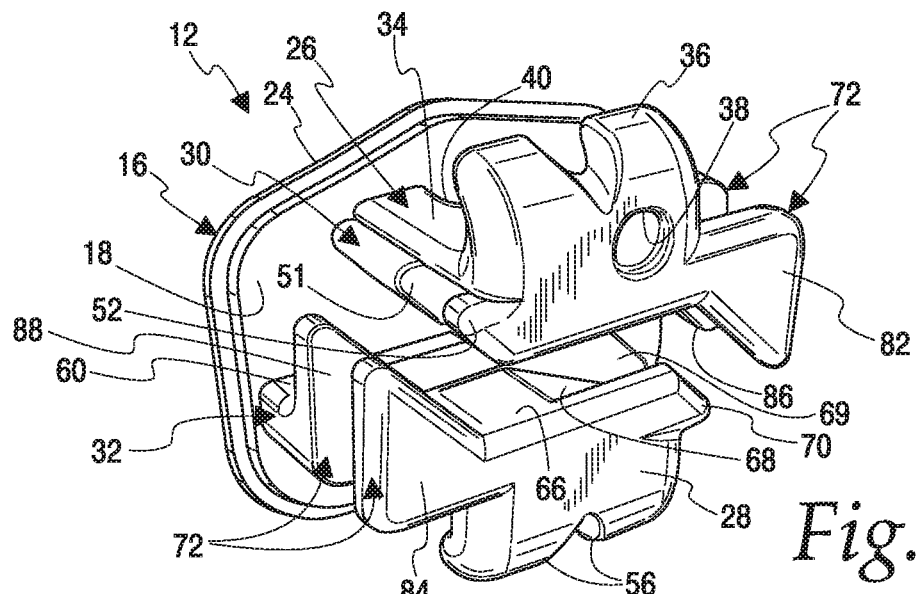
FIG. 1 is a perspective view of the orthodontic bracket of the present disclosure.

The present disclosure is directed to an orthodontic bracket for connecting an archwire to a tooth. The bracket has at least one archwire slot for receiving an archwire. An entry opening to the archwire slot permits the archwire to be installed in and removed from the archwire slot by a front-to-rear motion that is perpendicular to the length or axis of the archwire. In other words, the archwire can be installed by a lingual movement into the slot instead of a lengthwise threading movement. Furthermore, the bracket of the present disclosure has one or more slot boundary tabs that can serve as either a slot separating tab or as a ligating tab. The slot boundary tab protrudes vertically above or below a slot surface to either define separate archwire slots or retain an archwire in a front archwire slot.

A first embodiment of the bracket is shown generally at 12 in FIGS. 1-10. The bracket includes a base 16 which has a front surface 18 and a rear surface 22. The base 16 is somewhat of a plate-like member, although it is adapted for bonding to the crown of a tooth and thus it is usually not flat. Instead, the front surface 18 is slightly convex with a corresponding concave rear surface 22 that gets bonded to a tooth when in use. The illustrated base 16 has a quirk edge molding 24, although the shape of the molding could be otherwise.

The bracket 12 further includes a body member shown generally at 26. The body member 26 is attached to the front surface 18 of the base 16 and extends forwardly therefrom to a front face 28. In the illustrated embodiment the body member 26 has an upper body member half 30 and a lower body member half 32. The body member halves are spaced apart vertically from one another to define one or two archwire slots between them, as will be more fully described below. It will be understood that other configurations for the body member are possible and the separate body member halves shown are not the only way to configure the body member.

The upper body member half 30 has a central pad 34 cantilevered from the base 16. The central pad 34 extends forwardly from the base and has a pair of tie wings 36 mounted near the front face 28 of the body member 26. A circular depression 38 in one of the tie wings 36 serves to indicate the proper orientation of the bracket. A U-shaped vertical slot 40 (FIG. 3) extends through the pad 34 at the rear thereof. The back of the slot 40 is closed by the base 16. The upper body member half 30 also has a shelf 42, best seen in FIG. 3, that is attached to the right edge of the central pad 34 and the front surface 18 of the base 16. The shelf 42 extends laterally to the right of the pad. It also extends forwardly of the base but only about half as far as the central pad 34. Thus, the shelf 42 does not extend to the front face 28 of the body member.

In this embodiment the bracket includes both front and rear archwire slots. The rear archwire slot is partially defined by a portion of the front surface 18 of the base 16. Both the front and rear archwire slots are also partially defined by a plurality of archwire slot surfaces formed on the underside of the upper body member half 30. As seen in FIG. 8, the rear archwire slot surfaces on the upper body member half include coplanar ceiling portions 44A and 44B and an inclined portion 46. As seen in FIG. 7, the front archwire slot surfaces on the upper body member half include a horizontal uprighting stop 48 and an inclined tipping stop 50.

The tipping stop 50 is bounded at the rear by a vertical wall 51 formed in the central pad 34. The tipping stop 50 is bounded at the front of the upper body member half 30 by an upper extension 52, as seen in FIGS. 1-3 and 5. This extension is located at the front, lower left corner of the central pad 34. The upper extension 52 protrudes mesial-distally to the left from the central pad 34.

The lower body member half 32 in some respects can be considered a mirror image of the upper body member half 30. Thus, the lower body member half 32 has a central pad 54 cantilevered from the base 16. The central pad 54 extends forwardly from the base and has a pair of tie wings 56 mounted near the front face 28 of the body member. A U-shaped vertical slot 58 (FIG. 6) extends through the pad 54 at the rear thereof. The back of the vertical slot 58 is closed by the base 16. The vertical slots 40 and 58 are aligned with one another to provide a vertical slot or channel through the entire bracket. The vertical slot may optionally accommodate an uprighting spring. The lower body member half 32 also has a shelf 60, best seen in FIG. 6, that is attached to the left edge of the central pad 54 and the front surface 18 of the base 16. The shelf 60 extends laterally to the left of the pad 54. It also extends forwardly of the base but only about half as far as the central pad 54. Thus, the shelf 60 does not extend to the front face 28 of the body member. Also, it can be seen that since the lower shelf 60 is diagonally located with respect to the upper shelf 42, these portions are not mirror images of each other, at least not about a horizontal plane.

As mentioned above the bracket 12 includes both front and rear archwire slots, with the rear archwire slot partially defined by a portion of the front surface 18 of the base 16. Both the front and rear archwire slots are also partially defined by a plurality of archwire slot surfaces formed on the upper side of the lower body member half 32. As seen in FIG. 8, the rear archwire slot surfaces on the lower body member half include coplanar floor portions 62A and 62B and an inclined portion 64. As seen in FIGS. 1 and 7, the front archwire slot surfaces on the lower body member half 32 include a horizontal uprighting stop 66 and an inclined tipping stop 68.

Figure 2:
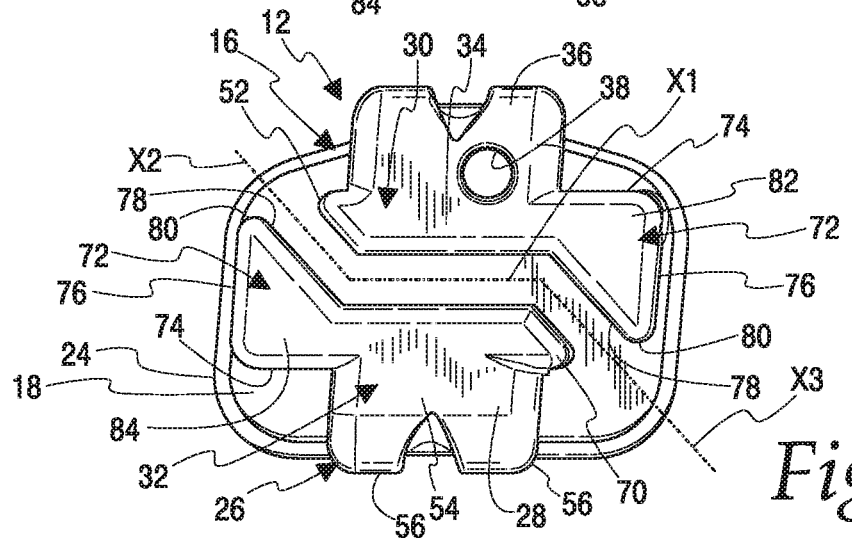
FIG. 2 is a front elevation view of the bracket of FIG. 1.
Figure 4:
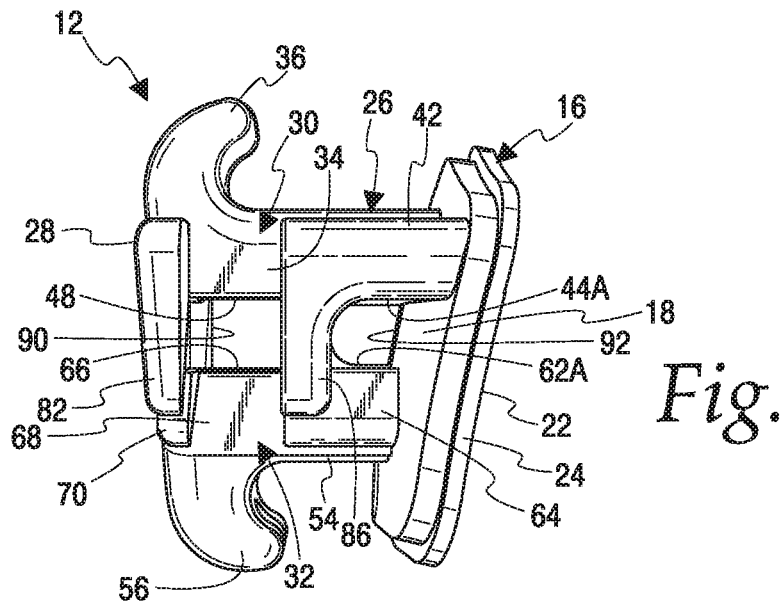
FIG. 4 is a right end elevation view of the bracket of FIG. 1, looking generally in the direction of arrow 4 in FIG. 7.
Figure 5:
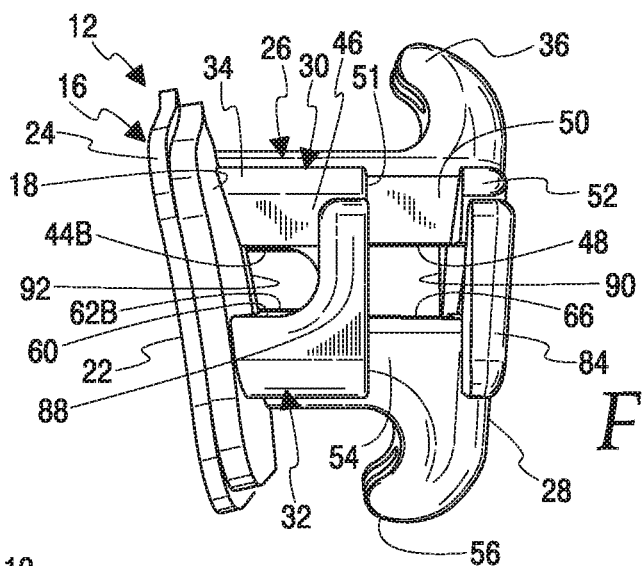
FIG. 5 is a left end elevation view of the bracket of FIG. 1.

The tipping stop 68 is bounded at the rear by a vertical wall 69 formed in the central pad 54. The tipping stop 68 is bounded at the front of the lower body member half 32 by a lower extension 70, as seen in FIGS. 1-2 and 4. This lower extension is located at the front, upper right corner of the central pad 54. The lower extension 70 protrudes mesial-distally to the right from the central pad 54.

The front and rear archwire slots are further defined by one or more slot boundary tabs indicated generally at 72. In this embodiment there are four slot boundary tabs. The slot boundary tabs are triangular structures extending generally vertically from a body member half. The slot boundary tabs 72 may extend upwardly from the lower body member half 32 or they may extend downwardly from the upper body member half 30. Furthermore, there are two different types of slot boundary tabs—ligating tabs and slot separating tabs. The types are differentiated by the location at which they are found mounted on the body member halves. Ligating tabs are located at or near the front face 28 of the body member 26. Slot separating tabs are located intermediate the front surface 18 of the base 16 and the front face 28 of the body member 26. The slot separating tabs are found only in brackets having front and rear archwire slots and, as the name implies, they separate the front archwire slot from the rear archwire slot.

All of the slot boundary tabs of whatever type have a similar construction so only one of them will be described in detail. A slot boundary tab has a triangular structure but other shapes could be used, including non-triangular shapes. As best seen in FIG. 2, the structures in the embodiment shown are right triangles including a base wall 74, a vertical wall 76 and an angled wall 78. The vertical wall 76 and angled wall 78 meet at a peak 80.

Turning to the specifics of the slot boundary tabs in the embodiment of FIGS. 1-10, there are two ligating tabs, an upper ligating tab 82 and a lower ligating tab 84.

The upper ligating tab 82 is attached to the upper body member half 30 at the front, lower right corner thereof. The upper ligating tab 82 extends to the right of the upper body member half 30 and it extends below the upper archwire slot surfaces 48 and 50 of the front archwire slot.

The lower ligating tab 84 is attached to the lower body member half 32 at the front, upper left corner thereof. The lower ligating tab 84 extends to the left of the lower body member half 32 and it extends above the lower archwire slot surfaces 66 and 68 of the front archwire slot. Thus, the upper and lower ligating tabs 82, 84 participate in the definition of the front archwire slot; they define the forward boundary of the front archwire slot.

Note that the ligating tabs 82, 84 are said to be "at" the front face 28 of the body member 26. It will be understood that "at" encompasses a ligating tab that is near the front face 26 as well. That is, the front surface of the tab could be lingually spaced somewhat from the front surface of the body member and still be considered "at" the front surface.

The slot boundary tabs in the embodiment of FIGS. 1-10 further include two slot separating tabs, an upper slot separating tab 86 and a lower slot separating tab 88. The upper slot separating tab 86 is attached to the upper body member half 30 at the front edge of the shelf 42. The upper slot separating tab 86 extends below the upper archwire slot surfaces 44A and 44B of the rear archwire slot.

The lower slot separating tab 88 is attached to the lower body member half 32 at the front edge of the shelf 60. The lower slot separating tab 88 extends above the lower archwire slot surfaces 62A and 62B of the rear archwire slot. Thus, the upper and lower slot separating tabs 86, 88 participate in the definition of both the front archwire slot and the rear archwire slot. The front surfaces of the slot separating tabs define the rear boundary of the front archwire slot and the rear surfaces of the slot separating tabs define the front boundary of the rear archwire slot.

All surfaces which define the archwire slots have now been described. It can be seen that the front archwire slot 90 is defined: a) at the front by the upper and lower ligating tabs 82, 84, and the upper and lower extensions 52, 70; b) at the bottom by the lower archwire slot surfaces 66, 68; c) at the rear by the upper and lower slot boundary tabs 86, 88 and the vertical walls 51 and 69; d) and at the top by the upper archwire slot surfaces 48, 50. Similarly, the rear archwire slot 92 is defined: a) at the front by the upper and lower slot boundary tabs 86, 88; b) at the bottom by the floor portions 62A, 62B and the inclined portion 64; c) at the rear by a portion of the front surface 18 of the base 16; d) and at the top by the ceiling portions 44A, 44B and inclined portion 46.

It will be noted that the front archwire slot 90 has both horizontal uprighting stops 48, 66 and inclined tipping stops 50, 68. These stops permit use of the Tip-Edge® (trademark of TP Othodontics, Inc.) technique. The Tip-Edge® technique is fully described in U.S. Pat. Nos. 5,125,832 and 6,682,345, both assigned to TP Orthodontics, Inc. and the disclosures of which are incorporated herein by reference. FIG. 10 illustrates that due to the presence and alignment of the inclined tipping stops 50 and 68, the front archwire slot 90 retains its full height even when the bracket is rotated about a lingual/buccal axis.

Having defined the archwire slots 90 and 92, it can now be seen that there are entry openings to each archwire slot. The front entry opening has a mesial/distal axis X (FIG. 2). The axis X has three segments. A first segment X1 is defined by the facing front edges of the central pads 34 and 54. A second segment X2 is defined by the angled wall of the lower ligating tab 84 and the angled edge of the upper extension 52. A third segment X3 is defined by the angled wall of the upper ligating tab 82 and the angled edge of the lower extension 70. As seen in FIG. 2, the axis X is non-linear. In this case it has a central horizontal portion X1, a portion X2 that is angled upwardly with respect to the central horizontal portion, and a portion X3 that is angled downwardly with respect to the central horizontal portion.

Similarly, the entry opening to the rear archwire slot has a mesial/distal axis Y (FIG. 7). Here again the axis Y has three segments. A first segment Y1 is defined by the ceiling and floor portions 44A, B and 62A, B of the central pads 34 and 54. A second segment Y2 is defined by the inclined wall 46 and the angled wall of the lower slot separating tab 88. A third segment Y3 is defined by the angled wall of the upper slot separating tab 86 and the inclined wall 64. Once again the axis Y is non-linear, having in this case a central horizontal portion Y1, a portion Y2 that is angled upwardly with respect to the central horizontal portion, and a portion Y3 that is angled downwardly with respect to the central horizontal portion.

It will be noted that all of the slot boundary tabs are attached to one of the body member halves and are located mesial/distally of the other body member half. This spacing of the slot boundary tabs from the other body member half advantageously provides ready access to the archwire slots behind the slot boundary tabs. That is, since there is no portion of the other body member half to the rear of a slot boundary tab, the archwire slot space behind the slot boundary tab is fully available to receive the archwire and any tools needed for installing or removing the archwire.

The use, operation and function of the bracket 12 are as follows. The orthodontist or practitioner bonds the rear surface 22 of the base 16 to the crown of a tooth. An archwire is then placed adjacent the front archwire entry slot parallel to the axis segment X1. The left portion of the archwire is raised or flexed upwardly to match the axis segment X2 and then the flexed portion of the archwire is pressed rearwardly, allowing it to slip past the lower ligating tab 84 into the front archwire slot 90. When this happens the angled portion of the archwire will return to horizontal and the previously horizontal portion of the archwire opposite the segment X1 will follow into the front archwire slot 90. Then the right portion of the archwire is flexed downwardly to match the axis segment X3. This allows the archwire to slip rearwardly past the upper ligating tab 82 and into the front archwire slot 90. Obviously the order in which the archwire is slipped up and over the ligating tabs could be reversed. Note that only a short portion of the archwire need be flexed from the horizontal position to slip it up and over a ligating tab and into the archwire slot. Note also that the ligating tabs will retain the archwire in the front archwire slot 90 without the need for ligatures.

If the treatment plan selected by the orthodontist calls for placement of an archwire in the rear archwire slot, an archwire placed in the front archwire slot 90 as just described is then moved to the rear archwire slot 92. Installation is similar in that a portion of the archwire is flexed to allow it to slip up and over first one of the slot separating tabs 86 or 88 and then the other, allowing the archwire to enter into the rear archwire slot 92. Finally, if two archwires are called for in the treatment plan a second archwire is installed into the front archwire slot 90 as described above after the first archwire has been installed in the rear archwire slot.

Removal of the archwires upon completion of a treatment is done by simply reversing of the above procedure. That is, a step-wise flexing of the left and right portions of an archwire so they can move up and over the slot boundary tabs allows removal of the archwire in a buccal/labial direction, not a mesial/distal direction.

It should be understood that various changes and modifications to the presently preferred embodiments described herein will be apparent to those skilled in the art. Such changes and modification can be made without departing from the spirit and scope of the invention disclosed herein. For example, while the base is shown herein as having basically a single thickness, the base could have multiple layers forming a stepped configuration. That is, there may be a bottom layer or pad whose rear surface will attach to the crown of a tooth plus a smaller outer layer or pad on the front of the bottom layer but having a smaller perimeter than the bottom layer. The body member is attached to the outer layer of the base and an archwire slot is bounded on the rear edge by the front surface of the outer layer of the base. Such an outer layer or pad on the front surface of a bottom layer may still be considered part of the base.

Furthermore, while the slot boundary tabs are described as extending vertically, it will be understood that some minor variation from a strictly vertical plane is possible. For example, the peaks of the ligating tabs may lean in slightly toward the front surface of the base such that the peak is located lingually from the base of the ligating tab.

Figure 3:
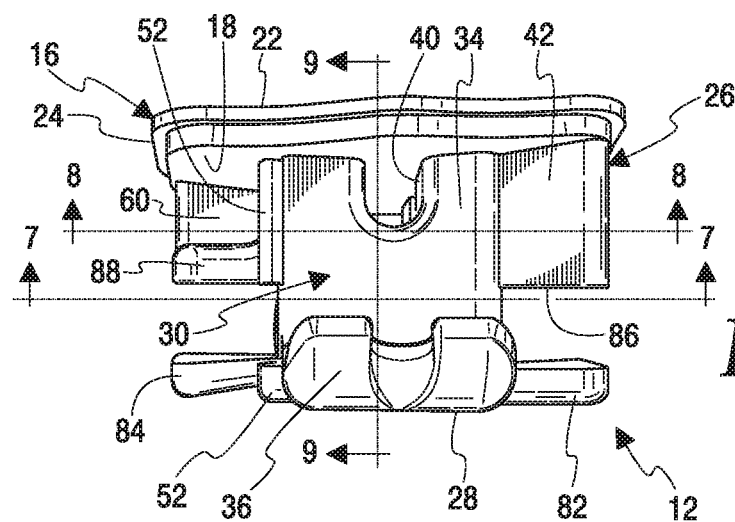
FIG. 3 is a top plan view of the bracket of FIG. 1.
Figure 6:
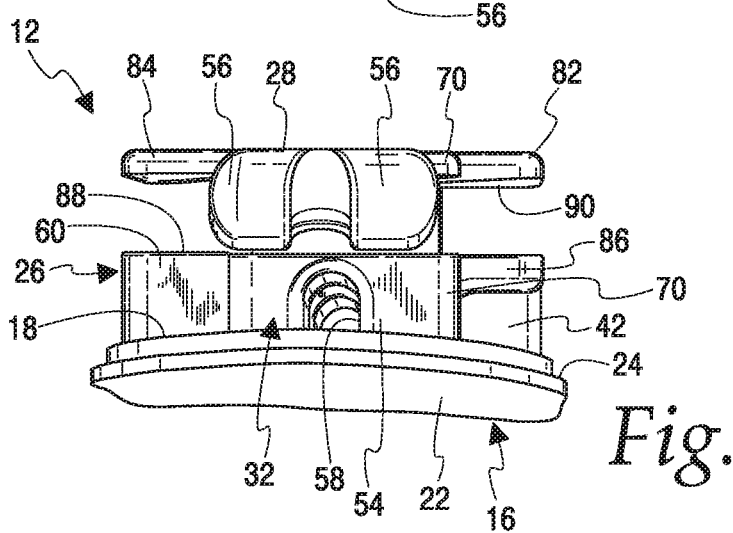
FIG. 6 is a bottom plan view of the bracket of FIG. 1.

Another possible variation would be to stagger the upper and lower locations of the slot boundary tabs on each side of the body member 26. That is, FIG. 1 illustrates the lower ligating tab 84 and the lower slot separating tab 88 both extending upwardly from the lower body half 32. Similarly, FIG. 1 illustrates the upper ligating tab 82 and the upper slot separating tab 86 both extending downwardly from the upper body half 30. In the alternate, staggered configuration the locations of the upper and lower ligating tabs 82, 84 would be reversed in the left and right directions. Thus, the upper ligating tab 82 would be placed on the left side of the upper body half 30 and the lower ligating tab 84 would be placed on the right side of the lower body half 32. The locations of the upper extension 52 and the lower extension 70 would also be reversed such that the upper extension 52 would be on the right side of the upper body half 30 and the lower extension 70 would be on the left side of the lower body half 32. Or the extensions could be deleted. The vertical walls 76 of the tabs on the left side of the body member would be aligned with one another front to back. The same would be true of the vertical walls 76 of the tabs on the right side of the body member. This front to back alignment of the vertical walls 76 of the tabs is best seen in FIGS. 2, 3 and 6.

The invention claimed is:

1. An orthodontic bracket, comprising:
   a base having front and rear surfaces, the rear surface being adapted for attachment to the crown of a tooth;
   a body member attached to the front surface of the base and extending forwardly therefrom to a front face of the body member, the body member including an upper half and a lower half when the body member is in a vertical orientation, the upper body member half having an archwire slot surface on an underside thereof and the lower body member half having an archwire slot surface on an upper side thereof; and
   at least one slot separating tab formed on one of the upper and lower body member halves and extending vertically toward the other of the upper and lower body member halves at least partially beyond the archwire slot surface of the body member half to which the at least one slot separating tab is attached, the at least one slot separating tab being located intermediate the front surface of the base and the front face of the body member half to which the slot separating tab is mounted, the at least one slot separating tab thereby defining a rear archwire slot between the at least one slot separating tab and the front surface of the base and the at least one slot separating tab defining a front archwire slot between the at least one slot separating tab and the front face of the body member half to which the at least one slot separating tab is mounted;

a ligating tab formed on one of the upper and lower body member halves and extending vertically toward the other of the upper and lower body member halves at least partially beyond the archwire slot surface of the body member half to which the ligating tab is attached and extending mesially or distally from the body member half to which the ligating tab is attached and beyond the other body member half, the ligating tab being located forwardly of the at least one slot separating tab and defining a ligating tab for the front archwire slot;

wherein the at least one slot separating tab has a peak at its greatest distance from the archwire slot surface of the body member half to which the at least one slot separating tab is attached and the peak is located mesially or distally of the other body member half;

the rear and front archwire slots being accessible from the front of the bracket and each having a height and a depth which allow at least one archwire to be supported by the upper and lower body member halves therein.

2. The orthodontic bracket of claim 1 wherein the archwire slot surfaces of the front and rear archwire slots each comprises a horizontal uprighting stop and a tipping stop disposed at an angle to the uprighting stop.

3. The orthodontic bracket of claim 2 wherein the uprighting stops on the upper and lower body member halves are diagonally opposed to one another and the tipping stops are on the upper and lower body member halves are diagonally opposed to one another.

4. The orthodontic bracket of claim 1 wherein the peak of the at least one slot separating tab extends vertically from a body member half beyond the archwire slot surface of the other body member half.

5. The orthodontic bracket of claim 4 wherein the peak of the at least one slot separating tab is located at a side edge of the at least one slot separating tab.

6. The orthodontic bracket of claim 1 wherein the archwire slot surfaces each comprise a horizontal uprighting stop.

7. The orthodontic bracket of claim 6 wherein the uprighting stops on the body member upper and lower halves are opposed to one another.

8. An orthodontic bracket, comprising:
a base having front and rear surfaces, the rear surface being adapted for attachment to the crown of a tooth;
a body member attached to the front surface of the base and extending forwardly therefrom to a front face of the body member, the body member including an upper half and a lower half, the upper body member half having an archwire slot surface on an underside thereof and the lower body member half having an archwire slot surface on an upper side thereof;
at least one slot separating tab formed on one of the upper and lower body member halves and extending vertically toward the other of the upper and lower body member halves at least partially beyond the archwire slot surface of the body member half to which the at least one slot separating tab is attached, the at least one slot separating tab being located intermediate the front surface of the base and the front face of the body member half to which the at least one slot separating tab is mounted, the at least one slot separating tab thereby defining a rear archwire slot between the at least one slot separating tab and the front surface of the base and the at least one slot separating tab defining a front archwire slot between the at least one slot separating tab and the front face of the body member half to which the at least one slot separating tab is mounted; and a ligating tab formed on one of the upper and lower body member halves and extending vertically toward the other of the upper and lower body member halves at least partially beyond the archwire slot surface of the body member half to which the ligating tab is attached and extending mesially or distally from the body member half to which the ligating tab is attached and beyond the other body member half, the ligating tab being located forwardly of the at least one slot separating tab and defining a ligating tab for the front archwire slot;

the front and rear archwire slots each having a front entry opening and defining a non-linear mesial-distal extending axis.

9. The orthodontic bracket of claim 8 further comprising a second slot separating tab formed on one of the upper and lower body member halves and extending vertically toward the other of the upper and lower body member halves at least partially beyond the archwire slot surface of the body member half to which the second slot separating tab is attached, the second slot separating tab being located intermediate the front surface of the base and the front face of the body member half to which the at least one slot separating tab is mounted.

10. The orthodontic bracket of claim 8 wherein the archwire slot surfaces of the front and rear archwire slots each comprises a horizontal uprighting stop and a tipping stop disposed at an angle to the uprighting stop.

11. The orthodontic bracket of claim 10 wherein the uprighting stops on the upper and lower body member halves are diagonally opposed to one another and the tipping stops on the upper and lower body member halves are diagonally opposed to one another.

12. The orthodontic bracket of claim 8 wherein the at least one slot separating tab has a peak at its greatest distance from the archwire slot surface of the body member half to which the at least one slot separating tab is attached and the peak is located mesially or distally of the other body member half.

13. The orthodontic bracket of claim 12 wherein the peak of the at least one slot separating tab extends vertically beyond the archwire slot surface of the other body member half.

14. The orthodontic bracket of claim 8 wherein the archwire slot surfaces each comprise a horizontal uprighting stop.

15. The orthodontic bracket of claim 14 wherein the uprighting stops on the upper and lower body member halves are opposed to one another.

16. The orthodontic bracket of claim 8 wherein the archwire slots have a front entry opening that has a horizontal portion and a non-horizontal portion.

17. An orthodontic bracket, comprising:
a base having front and rear surfaces, the rear surface being adapted for attachment to the crown of a tooth;
a body member attached to the front surface of the base and extending forwardly therefrom to a front face of the body member, the body member including an upper half and a lower half, the upper body member half having an archwire slot surface on an underside thereof and the lower body member half having an archwire slot surface on an upper side thereof, the closest vertical separation of the respective archwire slot surfaces defining an archwire slot height;
first and second ligating tabs, the first ligating tab formed on the upper body member half and the second ligating tab formed on the lower body member half, each ligating tab extending vertically from its body member half toward the other of the upper and lower body member halves at least partially beyond the archwire slot surface of the body member half to which the respective ligating tab is attached and each ligating tab extending mesially or distally from the body member half to which the ligating tab is attached and beyond the other body member half;
first and second extensions, the first extension formed on the lower body member half at least partially in vertical alignment with the first ligating tab and the second extension formed on the upper body member half at least partially in vertical alignment with the second ligating tab, the first and second extensions extending mesially or distally from the body member halves respectively and all portions of the first and second extensions being spaced from the first and second ligating tabs, respectively, a distance at least as large as the archwire slot height;
an archwire slot defined by the archwire slot surfaces, the first and second ligating tabs, and the first and second extensions.

* * * * *